(12) United States Patent
Baann et al.

(10) Patent No.: US 6,806,338 B2
(45) Date of Patent: Oct. 19, 2004

(54) INJECTION MOLDING POLYMER

(75) Inventors: Hege Vale Baann, Skjelsvik (NO); Ann Kristin Lindahl, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/311,171

(22) PCT Filed: Jun. 14, 2001

(86) PCT No.: PCT/GB01/02650

§ 371 (c)(1),
(2), (4) Date: May 5, 2003

(87) PCT Pub. No.: WO01/96419

PCT Pub. Date: Dec. 20, 2001

(65) Prior Publication Data

US 2003/0181608 A1 Sep. 25, 2003

(30) Foreign Application Priority Data

Jun. 14, 2000 (GB) ............................................. 0014547

(51) Int. Cl.$^7$ ...................... C08F 110/02; C08F 210/16; B29C 45/00; B65B 7/28
(52) U.S. Cl. ...................... 526/348; 526/352; 526/160; 264/478; 215/200
(58) Field of Search ................................ 526/348, 352; 264/478; 215/200

(56) References Cited

U.S. PATENT DOCUMENTS

| 4,424,243 A |   | 1/1984 | Nishimoto et al. ............ 428/36 |
| 5,015,511 A | * | 5/1991 | Treybig et al. ............. 428/34.1 |
| 5,026,798 A |   | 6/1991 | Canich ........................ 526/127 |
| 5,782,344 A |   | 7/1998 | Edwards et al. ............. 206/217 |
| 5,925,430 A |   | 7/1999 | Bayer et al. ................ 428/35.1 |
| 5,929,128 A |   | 7/1999 | Whetten et al. .............. 521/85 |

FOREIGN PATENT DOCUMENTS

| JP | 9-30566 | * | 2/1997 |
| JP | 10147370 |   | 2/1998 |
| JP | 10147370 | * | 6/1998 |
| WO | 98/46409 |   | 10/1998 |
| WO | WO 98/46409 | * | 10/1998 |

* cited by examiner

Primary Examiner—Roberto Rabago
(74) Attorney, Agent, or Firm—Ohlandt, Greeley, Ruggiero & Perle, LLP

(57) ABSTRACT

An LLDPE produced using a single site catalyst, e.g., an LLDPE produced using a metallocene (m-LLDPE), is preferably used in injection moulding of food packaging material, especially closures for food containers. Such materials have been found to exhibit low levels of migration, typically less than 40 mg/dm$^2$, e.g., less than 5 mg/dm$^2$, and are particularly suitable for use in packaging foods having a high fat content.

25 Claims, No Drawings

INJECTION MOLDING POLYMER

FIELD OF THE INVENTION

The present invention relates to improvements in or relating to linear low density polyethylenes (LLDPEs), in particular to the use of LLDPEs for injection moulding and to products obtainable thereby.

DISCUSSION OF THE BACKGROUND ART

LLDPEs are widely used in the manufacture of packaging products, which are typically produced by moulding techniques, especially injection moulding. LLDPE materials used for these purposes are typically produced using conventional Ziegler-Natta catalysts.

In cases where an injection moulded LLDPE product is to be used in critical applications, e.g. in the packaging of food or medical products, particularly as closure means (e.g. lids) for food containers, it is essential that this should not contaminate the packaged product. For food packaging applications, an indication of the degree of contamination may be obtained from tests which determine the level of migration of the polymer material, e.g. when immersed in a fatty food simulant such as olive oil. In the case of LLDPEs prepared using Ziegler-Natta catalysts the levels of migration have been found to be too high to permit their use in the production of injection moulded packaging materials for food and medical products, especially fatty foods.

Surprisingly, we have now found that by using LLDPEs produced using a single site catalyst, in particular those produced using a metallocene catalyst (m-LLDPEs), it is possible to produce moulded products (e.g. injection moulded products) having acceptable migration levels for use in packaging food and medical products, especially for use in packaging foods having a high fat content, such as cheese, mayonnaise, ketchup, butter, etc.

SUMMARY OF THE INVENTION

Thus viewed from one aspect the invention provides the use of an LLDPE produced using a single site catalyst, in particular an LLDPE produced using a metallocene (m-LLDPE), in injection moulding of food packaging material, especially closures for food containers.

Particularly preferred for use in the invention are LLDPEs having a relatively narrow molecular weight distribution or MWD (i.e. the ratio of the weight average molecular weight to the number average molecular weight), e.g. those having a MWD ranging from 2 to 60, preferably from 3 to 10, more preferably from 3 to 6.

Viewed from a further aspect the invention provides an injection moulded article, e.g. an injection moulded closure, particularly a closure for a food container, formed from an LLDPE produced using a single site catalyst, preferably from a metallocene LLDPE, said LLDPE preferably having a MWD in the range of from 2 to 60, preferably from 3 to 10, more preferably from 3 to 6.

LLDPE materials which have been found to be particularly suitable for use in the production of injection moulded packaging materials for food and medical products are those having migration levels of less than 40 mg/dm$^2$, preferably less than 10 mg/dm$^2$, e.g. less than 5 mg/dm$^2$.

Viewed from a further aspect the invention thus provides an LLDPE, e.g. a metallocene LLDPE, suitable for use in injection moulding having a migration level of less than 40 mg/dm$^2$, preferably less than 10 mg/dm$^2$, e.g. less than 5 mg/dm$^2$.

Viewed from a still further aspect the invention provides the use of an LLDPE, e.g. a metallocene LLDPE, in forming an article, preferably a closure for a container, having a migration level of less than 40 mg/dm$^2$, preferably less than 10 mg/dm$^2$, e.g. less than 5 mg/dm$^2$.

By polyethylene is meant a polymer the majority by weight of which derives from ethylene monomer units. A minor proportion, e.g. not more than 20% by weight, more preferably not more than 15% by weight, of the polymer may derive from other monomers copolymerisable with ethylene. Suitable comonomers include those selected from $C_{3-20}$ mono or multiple unsaturated monomers, in particular $C_{3-10}$ α-olefins, e.g. propene, but-1-ene, pent-1-ene, 3-methyl-but-1-ene, 4-methyl-pent-1-ene, hex-1-ene, 3,4-dimethyl-but-1-ene, hept-1-ene, 3-methyl-hex-1-ene, etc. Preferably the monomers will be selected from propene, but-1-ene, hex-1-ene and oct-1-ene. As used herein, ethylene copolymer is intended to encompass a polyethylene deriving from ethylene and one or more monomers copolymerisable with ethylene.

The polyethylene may also contain minor amounts, e.g. not more than 10% by weight, preferably not more than 5% by weight, of other polymers, e.g. other polyolefins such as polypropylenes. Conventional additives such as antioxidants, UV-stabilizers, colours, fillers, etc., generally in amounts of up to 10% by weight, e.g. up to 5% by weight, may also be present.

By LLDPE is meant a polyethylene having a density of 890 to 940 kg/m$^3$, preferably 915 to 930 kg/m$^3$, especially 917 to 926 kg/m$^3$, and a crystallinity of 20 to 60%, preferably 30 to 50%, especially 40 to 50%.

LLDPEs useful in the invention include mono-modal, bi-modal and multi-modal polymers. Mono-modal polymers, which are typically characterised by a narrow molecular weight distribution, may be advantageous. Typically a mono-modal polymer having a narrow MWD will be produced in a single polymerization stage under a single set of processing conditions (temperature, pressure, etc.) using a single monomer and a single polymerization catalyst.

Bi-modal and multi-modal LLDPEs useful in the invention may be produced by blending two or more mono-modal polyethylenes having different MWDs. Alternatively and preferably, they may be produced by polymerization under conditions which create a bi-modal or multi-modal polymer, e.g. using two or more single site catalysts and/or using a catalyst system or mixture with two or more different catalytic sites, or using two or more polymerization stages in which the reactants are subjected to different reaction conditions (e.g. different temperatures, pressures, polymerization media, hydrogen partial pressures, etc.) (see EP-A-778289).

DETAILED DESCRIPTION OF THE PREFERRED EMBODIMENT

The or each polymerization stage used to produce LLDPEs for use in the invention may be effected using conventional ethylene homo- or co-polymerization procedures such as slurry, gas phase or solution polymerization, gas phase polymerization being preferred. The polymerization process may use one or more conventional reactors, e.g. loop reactors, gas phase reactors, etc. For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer. Hydrogen may also be present to further control the molecular weight of the polymer produced in the reactor. Molecular weight control may be effected through control of the hydrogen concentration or, alternatively, through control of the hydrogen consumption during the polymerization process.

Bi-modal (or multi-modal) LLDPE may be produced using a multi-stage polymerization process, e.g. using a series of reactors in which comonomer may be added in only the reactor(s) used for production of the higher (or highest) molecular weight component(s). A first polymerization stage may be carried out in a slurry loop reactor, typically operated at 80 to 100° C. and a containing the active catalyst, is continuously withdrawn, separated from the reaction medium and transferred to a gas phase reactor in which a second polymerization stage is carried out. The second gas phase reactor is usually operated at 80 to 90° C. and a pressure of from 25 to 30 bar.

Catalysts for use in producing LLDPEs useful in the invention may be selected from conventional single site catalysts. By single site catalyst is meant a catalyst which provides a single type of catalytically effective site at which polymer chain extension occurs. Particularly preferred as single site catalysts are the metallocenes, optionally supported on inorganic or organic substrates, in particular on porous oxides such as silica, alumina or silica-alumina. Advantageously these may also be used in combination with a co-catalyst, particularly preferably an aluminoxane.

The term metallocene as used herein is used to refer to any catalytically active complex containing one or more η-ligands. The metal in such complexes is preferably a group 4, 5, 6, 7 or 8 metal or a lanthanide or actinide, especially a group 4, 5 or 6 metal, particularly Zr, Hf, Ti or Cr, particularly preferably Zr or Hf. The η-ligand preferably comprises a cyclopentadienyl ring, optionally with a ring carbon replaced by a heteroatom (e.g. N, B, S or P), optionally substituted by pendant or fused ring substituents and optionally linked by a bridge (e.g. a 1 to 4 atom bridge such as $(CH_2)_2$, $C(CH_3)_2$ or $Si(CH_3)_2$) to a further optionally substituted homo or heterocyclic cyclopentadienyl ring. The ring substituents may for example be halo atoms or alkyl groups optionally with carbons replaced by heteroatoms such as O, N and Si, especially Si and O and optionally substituted by mono or polycyclic groups such as phenyl or naphthyl groups.

Suitable metallocenes and aluminoxane co-catalysts are well known from the scientific and patent literature, e.g. from the published patent applications of Hoechst, Montell, Borealis, Exxon and Dow.

LLDPEs used according to the invention will preferably have the following properties:
$MFR_{2.16}$: 20 to 100, preferably 30 to 80, e.g. 30 to 50;
Density: 910 to 930 $kg/m^3$, preferably 920 to 930 $kg/m^3$;
Mw (weight average molecular weight): 20 to 100 kD, preferably 40 to 50 kD;
Mn (number average molecular weight): 5 to 30 kD, preferably 10 to 15 kD;
MWD (i.e. the ratio of the weight average molecular weight to the number average molecular weight): 3 to 10, more preferably 3 to 6.
E-modulus: >180 MPa, preferably 200 to 300 MPa;
Tensile impact strength: 50 to 300 $KJ/m^2$, preferably >100 $KJ/m^2$;
Elongation at break: >400%;
Tensile stress at yield: 5 to 15 MPa, preferably 7 to 10 MPa;
Vicat Softening Temperature (10N): 75 to 150° C., preferably 85 to 100° C.

LLDPEs may, for example, be injection moulded in accordance with the invention using conventional injection moulding equipment, e.g. operating at injection temperatures of 180 to 280° C., e.g. about 200° C. and injection speeds in the range of from 10 to 500 mm/sec, preferably about 100 mm/sec. Suitable mould temperatures may range from 0 to 80° C. Closures produced in this way will typically have maximum dimensions in the range of 5 to 1000 mm.

Viewed from a further aspect the invention thus provides a closure for a food container, which closure is formed from an LLDPE as herein described, e.g. a metallocene LLDPE, preferably an LLDPE having a migration level of less than 40 $mg/dm^2$, preferably less than 10 $mg/dm^2$, e.g. less than 5 $mg/dm^2$.

Closures produced using LLDPEs as herein described are particularly suitable for use in packaging of foods, e.g. bread, salads, cakes, puddings, soups, cheese, mayonnaise, ketchup, butter, etc., especially foods having a high fat content. They may also be suitable for use in packaging medical products in cases where it is important that migration of the polymer material should be prevented, e.g. in packaging of solutions, suspensions, emulsions, syrups, etc.

The LLDPE products herein described are particularly suited to use as closures, e.g. caps or lids, where a degree of flexibility is necessary for their removal by the consumer. In such cases, the products may be used in conjunction with, for example, plastic (e.g. polypropylene), glass or metal containers.

The invention will now be further described with reference to the following non-limiting Examples.

EXAMPLE 1

Catalyst Preparation

All reactions were carried out under a nitrogen atmosphere. 40 ml of a 30% solution of methylaluminoxane (MAO) in toluene was diluted with 40 ml of toluene. The resulting solution was added to 22.6 g of rac-(ethylenebis (2-(tert-butyldimethylsiloxy)indenyl)) zirconium dichloride ($ABO_3Cl_2$). This MAO/metallocene solution was combined with another 1250 ml of a 30% w/w solution of MAO. After a reaction time of 10 minutes the total volume of solution was added to 1000 g of silica placed in a reactor under an inert atmosphere. The resulting mixture was allowed to react for 90 minutes. Drying was effected by flushing with nitrogen and simultaneously heating the reaction vessel to 85° C. for 18 hours. The thus-obtained catalyst was a dry, free-flowing powder.

EXAMPLE 2

Polymer Preparation and Properties

Ethylene, hexene, hydrogen and nitrogen together with a polymerization catalyst prepared in accordance with Example 1 were fed to a gas phase reactor with fluidised bed operating at 75° C. and 17.5 bar. Polymer production rate was approx. 10–11 kg PE/h. Circulation gas velocity was maintained at about 2200 kg/h and the bed level was 2.0 m.

Polymerization parameters are set out in the following Table 1:

TABLE 1

|  | Sample 1 | Sample 2 | Sample 3 |
|---|---|---|---|
| Ethylene feed (kg/h) | 17.9 | 16.2 | 17.1 |
| Ethylene partial pressure (bar) | 14.8 | 14.7 | 13.9 |
| Hydrogen feed (kg/h) | 0.001 | 0.001 | 0.0014 |
| $H_2/C_2$ (*100) | 0.122 | 0.2 | 0.13 |
| Hexene feed (kg/h) | 1.2 | 1.2 | 1.1 |
| Hexene/$C_2$ (*100) | 1.5 | 1.9 | 1.5 |
| Production rate (kg/h) | 11.0 | 9.6 | 11.0 |

Properties of the polymer products compared to those of an LLDPE product obtained using the Ziegler-Natta (Z/N) catalyst M-cat (UCC) are set out below in Table 2:

TABLE 2

|  | Sample 1 | Sample 2 | Sample 3 | Z/N-derived polymer |
|---|---|---|---|---|
| $MFR_{2.16}$ (g/10 mm)[1] | 31 | 51 | 48 | 28 |
| Density (kg/m$^3$)[2] | 926 | 921 | 921 | 919 |
| Mw[3] | 49000 | 41000 | 41000 | 55000 |
| Mn[3] | 12000 | 11000 | 13000 | 10000 |
| MWD[3] | 4.1 | 3.8 | 3.2 | 5.4 |
| E-modulus (MPa)[4] | 280 | 230 | 220 | 180 |
| Tensile impact strength (KJ/m$^2$)[5] | 130 | 170 | 170 | 110 |
| Elongation at break (%)[6] | >400 | >400 | >400 | >400 |
| Tensile stress at yield (MPa)[7] | 10 | 8.7 | 8.5 | 7.5 |
| Vicat (° C.)[8] | 98 | 91 | 90 | 82 |

[1]$MFR_{2.16}$ determined at 190° C. using 2.16 kg load according to ISO 1133
[2]Density determined using ISO 1183
[3]Mw, Mn and MWD measured by GPC equipment (gel permeation chromatography, size exclusion chromatography) according to BTM 15521 (Borealis) at 140° C., solvent: trichlorobenzene (Flowrate: 1.0 ml/min). See H. G. Barth and J. M. Mays (Eds.): Modern Methods of Polymer Characterization (Chemical Analysis Vol. 113), John Wiley & Sons, 1991.
[4]E-modulus determined using ISO 527-2
[5]Tensile impact strength determined according to ISO 8256/A1
[6]Elongation at break determined according to ISO 527-2
[7]Tensile stress at yield determined according to ISO 527-2
[8]Vicat determined according to ISO 306

EXAMPLE 3

Injection Moulding

Using Samples 1, 2 and 3 produced in accordance with Example 2, test specimens (lids) were produced by injection moulding on a Netstal 300 injection moulding machine according to the following parameters:

Melt temperature: 200° C.

Standard screw: 70 mm/25D

Injection speed: 100 mm/sec

Hold-on pressure: 3 sec

Cooling time: 5 sec

Mould temperature: 30° C. (injection side)

15° C. (cavity side)

Migration tests on the moulded products were performed in olive oil for 10 days at 40° C. (total immersion). Hexane extractables were determined by extraction in n-hexane at 50° C. for 2 hours. Results are set out in Table 3 below:

TABLE 3

|  | Sample 1 | Sample 2 | Sample 3 | Z/N-derived polymer |
|---|---|---|---|---|
| Global migration (mg/dm$^2$)[1] | 0.5 and -3.9 | — | — | 48.8 and 45.3 |
| Hexane extractables (% w/w)[2] | 0.91 | 1.2 | 1.2 | 5.3 |

[1]Migration determined according to ENV 1186-2 (ENV = European pre-standard)
[2]Hexane extractables determined according to FDA (US) standard 177.1520

All products were found to exhibit low warpage and distortion.

EXAMPLE 4

Migration Data for Compression Moulded LLDPE Samples 1 mm thick compression moulded sheets of a variety of polyethylene grades prepared using single site metallocene catalysts and (for comparative purposes) of one grade produced using a Ziegler-Natta catalyst were subjected to migration tests by immersion in olive oil at 40° C. for 10 days. The results are shown in Table 4 below:

TABLE 4

| Producer | Product | MFR$_2$ (at 190° C.) | Density (kg/m$^3$) | Migration (mg/dm$^2$) |
|---|---|---|---|---|
| Fina | Finacene 2245ER | 0.9 | 933 | -9.2 |
| Dow | Elite 5400 | 0.8 | 917 | -5.1 |
| Mitsui | Evolue SP2520 | 1.8 | 925 | -6.1 |
| Borealis | POKO 1082[1] | 1.2 | 914 | -9.7 |
| Borealis | Borecene ME8160[2] | 6 | 940 | -6.6 |
| Borealis | Si1-7059[3] | 31 | 926 | -3.9 |
| Borealis | LE8030[4] | 28 | 919 | 45.3 |

Notes
[1]Bimodal product with MWD = 6–7, prepared using single site catalyst.
[2]Monomodal product with MWD = 2.5, prepared using single site catalyst.
[3]Monomodal product with MWD = 3.5, prepared using single site catalyst.
[4]Comparative result for product prepared with Ziegler-Natta catalyst.

EXAMPLE 5

Polymer Preparation and Properties

Reactor produced bi-modal LLDPE may be produced as follows:

Ethylene, hydrogen and 1-butene comonomer together with the polymerization catalyst (nBuCp)$_2$HfCl$_2$/MAO (supported on silica) are introduced into a loop reactor operated at 80° C. and 65 bar. Polymerization parameters are set as follows: $H_2/C_2$: 0.4 mol/kmol, $C_4/C_2$: 140 mol/kmol. The MFR$_2$ and density of the product are estimated at 120 g/10 min and 937 kg/m$^3$ respectively.

The resulting polymer (still containing the active catalyst) is separated from the reaction medium and transferred to a gas phase reactor where additional hydrogen, ethylene and 1-butene comonomer are added. Polymerization parameters are set as follows: $H_2/C_2$: 1–3 mol/kmol, $C_4/C_2$: 40–45 mol/kmol. A polyethylene having MFR$_2$ in the range 30–50 g/10 min and density 920–930 kg/m$^3$ is produced.

What is claimed is:

1. A method for producing a food packaging material which comprises:

injecting a linear low density polyethylene (LLDPE) produced using a single site catalyst into a mould wherein said LLDPE exhibits the following characteristics:

an $MFR_{2.16}$ of from about 20 to 100;

a density of from about 910 to 930 ka/m3;

a weight average molecular weight (Mw) of from about 20 to 100 kD;

a number average molecular weight (Mn) of from about 5 to 30 kD; and a ratio of the weight average molecular weight to the number average molecular weight (MWD) is about 3 to 6.

2. The method claimed in claim 1 wherein said LLDPE is a metallocene LLDPE.

3. The method claimed in claim 1 wherein food packaging material is a closure for a food container.

4. An injection moulded article formed from an LLDPE produced using a single site catalyst wherein said LLDPE exhibits the following characteristics:

an $MFR_{2.16}$ of from about 20 to 100;

a density of from about 910 to 930 kg/m3;

a weight average molecular weight (Mw) of from about 20 to 100 kD;

a number average molecular weight (Mn) of from about 5 to 30 kD; and a ratio of the weight average molecular weight to the number average molecular weight (MWD) is about 3 to 6.

5. An article as claimed in claim 4 formed from a metallocene LLDPE.

6. An article as claimed in claim 4 wherein said injection moulded article is a closure.

7. An article as claimed in claim 6 wherein said closure is for a food container.

8. An LLDPE suitable for use in injection moulding, said LLDPE comprising a migration level of less than 10 mg/dm2 and having an $MFR_{2.16}$ of 20 to 100.

9. The LLDPE as claimed in claim 8 wherein said LLDPE is a metallocene LLDPE.

10. The LLDPE as claimed in claim 8 wherein said LLDPE exhibits the following characteristics:

an $MFR_{2.16}$ of from about 20 to 100;

a density of from about 910 to 930 kg/m3;

Mw (weight average molecular weight) of from 20 to 100 kD;

a number average molecular weight (Mn) of from about 5 to 30 kD; and a ratio of the weight average molecular weight to the number average molecular weight (MWD) of about 3 to 10.

11. A method for producing an article which comprises:

injecting a linear low density polyethylene (LLDPE) into a mould, wherein said LLDPE has a migration level of less than 10 mg/dm2 and an $MFR_{2.16}$ of 20 to 100.

12. The method claimed in claim 11 wherein said LLDPE is a metallocene LLDPE.

13. The method claimed in claim 11 wherein said article is a closure for a container.

14. The method claimed in claim 11 wherein said LLDPE exhibits the following characteristics:

an $MFR_{2.16}$ of from about 20 to 100;

a density of from about 910 to 930 kg/m3;

a weight average molecular weight (Mw) of from about 20 to 100 kD;

a number average molecular weight (Mn) of from about 5 to 30 kD; and a ratio of the weight average molecular weight to the number average molecular weight (MWD) of about 3 to 10.

15. A closure for a food container, which closure is formed from an LLDPE wherein said LLDPE exhibits the following characteristics:

an $MFR_{2.16}$ of from about 20 to 100;

a density of from about 910 to 930 kg/m3;

a weight average molecular weight (Mw) of from about 20 to 100 kD;

a number average molecular weight (Mn) of from about 5 to 30 kD: and a ratio of the weight average molecular weight to the number average molecular weight (MWD) is about 3 to 6.

16. The closure as claimed in claim 15 wherein said LLDPE is a metallocene LLDPE.

17. The closure as claimed in claim 15 which is farmed from an LLDPE having a migration level of less than 40 mg/dm2.

18. The closure as claimed in claim 15 which is associated with a plastic, glass or metal container.

19. The closure as claimed in claim 18 wherein said plastic is polypropylene.

20. The LLDPE according to claim 8 wherein said migration level is less than 5 mg/dm2.

21. The LLDPE according to claim 10 wherein said ratio of the weight average molecular weight to the number average molecular weight is about 3 to 6.

22. The method according to claim 11 wherein said migration level is less than 5 mg/dm2.

23. The method according to claim 14 wherein said ratio of the weight average molecular weight to the number average molecular weight is about 3 to 6.

24. The closure as claimed in claim 17 wherein said migration level of less than 10 mg/dm2.

25. The closure as claimed in claim 24 wherein said LLDPE has an $MFR_{2.16}$ of 20 to 100.

* * * * *